(12) United States Patent
Lin et al.

(10) Patent No.: US 7,324,089 B2
(45) Date of Patent: Jan. 29, 2008

(54) OPTICAL DEVICE FOR OPTICAL MOUSE

(75) Inventors: Timothy Lin, Taipei (TW); Yu-Min Lin, TaiChung (TW)

(73) Assignees: Leahsin Technologies Inc., Taipei (TW); Elan Microelectronics Corporation, Hsinchu (TW)

( * ) Notice: Subject to any disclaimer, the term of this patent is extended or adjusted under 35 U.S.C. 154(b) by 596 days.

(21) Appl. No.: 10/856,761

(22) Filed: Jun. 1, 2004

(65) Prior Publication Data
US 2005/0264532 A1    Dec. 1, 2005

(51) Int. Cl.
*G09G 5/08* (2006.01)

(52) U.S. Cl. .................. 345/163; 345/167; 250/221; 250/227.24; 362/332; 362/365; 362/455; D14/402; D14/405

(58) Field of Classification Search ............ 345/156, 345/163, 166, 167; 362/396, 455; 250/221, 250/222.1, 227.24
See application file for complete search history.

(56) References Cited

U.S. PATENT DOCUMENTS

| | | | | |
|---|---|---|---|---|
| 5,517,211 A | * | 5/1996 | Kwang-Chien | ............ 345/166 |
| 6,421,045 B1 | * | 7/2002 | Venkat et al. | ............... 345/167 |
| 6,476,970 B1 | * | 11/2002 | Smith | ......................... 359/618 |
| 6,501,460 B1 | * | 12/2002 | Paik et al. | .................. 345/163 |
| 6,531,692 B1 | * | 3/2003 | Adan et al. | ................. 250/221 |
| 7,131,751 B1 | * | 11/2006 | Theytaz et al. | ............. 362/396 |

* cited by examiner

*Primary Examiner*—Henry N Tran
(74) *Attorney, Agent, or Firm*—Troxell Law Office, PLLC

(57) ABSTRACT

The present invention relates to an improved optical device for optical mouse, being installed inside the case body of the optical mouse, comprising: a LED, a lens mount, a sensor and a digital signal processor. That is, instead of using the LED, the LED assembly clip, the positioning holes and the lens mount, which are separated from and independent to one another, for fixing the LED inside the optical mouse, the present invention uses a combined device featuring foolproof, and positioning-insetting-all-in-one concept can place the LED precisely at the first lens of the lens mount and is capable of installing the LED accurately onto the lens mount and the same time rapidly and effectively adjusting and fixing the relative angle and position as seen in FIG. 6 between the lens mount and the LED. Moreover, the combined device is easy to positioned such that the forgoing shortcomings of high manufacturing cost and difficult to mass-produced are avoided.

9 Claims, 6 Drawing Sheets

OPTICAL DEVICE FOR OPTICAL MOUSE

FIELD OF THE INVENTION

The present invention relates to an improved optical device for optical mouse, especially to the improved optical device for optical mouse capable of rapidly and precisely installing a LED component on a lens mount, which is used for receiving and collimating light, so as to enhance more accuracy and practicability.

BACKGROUND OF THE INVENTION

Along with the progress of technology, computer has become part of our daily life, and therefore I/O devices, such as mouse and keyboard, are improved as well to be more user friendly. The usage of the mouse is more than the keyboard except for typewriting, and there are two types of mouse in the market, which are mechanical mouse and optical mouse. The mechanical mouse uses a ball and related sensors to detect the position of the mouse, and has characteristics of lower technical skill, lower cost, but it is ease to carry and accumulate dust inside the internal thereof while the ball is rolling that will eventually affect the normal operation of the same. On the other hand, optical mice using light to detect the position of the mice will have no such problem. However, it has a structure more complicate than the mechanical one and thus has a higher manufacturing cost. Referring to FIG. 1, which is an exploded view of an optical mouse according to prior arts. The optical mouse currently sold in the market comprises: a case body 11, a control circuit 12, and an optical system 13, wherein the optical structure 13 further comprises a light emitting diode (LED) 131, an LED assembly clip 132, a lens mount 133, a sensor 134 and a digital processor (not shown). Typically, the optical mouse uses the LED 131 for illuminating a surface, such as a mouse pad or surface of a table. The light strikes the surface and a portion of light is reflected to generate patterns of different size. The sensor 134 will then record the reflected light. Based on the reflected light, the digital processor determines the movement and direction of the mouse.

In view of the above description, it is noted that the accuracy of the positional information derived from the reflected light is dependent on the quality of the light emitted from the LED 131. In a convention optical mouse as seen in FIG. 1, the LED assembly clip 132 fixes the LED 131 onto the control circuit 12 corresponding to the positioning holes 121 for arranging the LED 131 at the lens mount 133 and enabling the axis of the light emitted by LED 131 to be coaxial with that of the lens mount 133 so as to completely bring the illumination light generated by the LED 131 into full play. In this regard, the precise installation of the LED 131, the LED assembly clip 132 and the lens mount 133 on the exact positions corresponding to the positioning holes 121 can ensure the optical mouse to operate accurately.

However, the optical structure of prior arts may need to be advanced while in application. For instance, the LED assembly clip 132, the positioning holes 121 and the lens mount 133 formed separately not only increase the difficulty of manufacturing the same, but also increase the cost. Moreover, the conventional optical mouse has problem to position the devices therein properly and precisely, in addition, its complex structure induces high manufacturing cost and increase difficulty of mass-production such that the quality and the cost can not be controlled and enhanced.

The devices used in the prior art for fixing the LED 131, such as the LED assembly clip 132 and the positioning holes 121 on control circuit 12, are parallel to the working surface of the optical mouse such that the lens mount 133 receiving the light emitted from the LED 131 can not collimate the same onto the working surface. In view of the description above, the U.S. Pat. No. 6,476,970, "Illumination Optics and Method", submitted by George Edward Smith, filed on Aug. 10, 2000, combines the lens mount 133 and a prism 135 to collimate illumination light onto a working surface 14 by reflecting the same twice as seen in FIG. 2. However, according to the Snell Law, light is lost during every reflection, and therefore the additional prism 135 not only increases the manufacturing cost of lens mount 133, but also more light will be lost during reflection.

Moreover, referring to FIG. 1, a means for fixing the LED 131 and the LED assembly clip 132 is to have a positioning structure with a pair of upper and lower half-arcs or right and left half-arcs arranged on the case body 11 to fasten LED 131. It is hardly to avoid the dropping of the mouse due to careless operation that causes the axis of the light emitted by LED 131 to shift by the vibration and therefore the axis of the light emitted by LED 131 is not perpendicular to a central line of an optical system of the optical mouse, and consequently, the sensor 134 can not record a clear and uniform image by which the digital processor can not determines the movement and direction of the mouse accurately.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

SUMMARY OF THE INVENTION

The primary object of the present invention is to provide an improved optical device for optical mouse, that is, instead of using the LED assembly clip, the positioning holes and the lens mount, which are separated from and independent to one another, for fixing the LED inside the optical mouse, a combined device of the LED assembly clip insetting with the lens mount capable of installing the LED accurately onto the lens mount and the same time rapidly and effectively adjusting and fixing the relative angle and position between the lens mount and the LED, moreover, the combined device is easy to positioned such that the forgoing shortcomings of high manufacturing cost and difficult to mass-produced are avoided.

Another object of the present invention is to provide an improved optical device for optical mouse, wherein the lens mount responsible for receiving source light is tilted and installed on a location where LED being inlaid. The tilt angle is between 20 to 35 degrees such that the lens mount can receive and collimate light onto a working surface. Comparing to the U.S. Pat. No. 6,476,970, the loss of light is greatly reduced.

Yet, another object of the present invention is to provide an improved optical device for optical mouse with a supporting pedestal abutted against the front of the lens mount in addition to a pair of upper and lower half-arcs or right and left half-arcs arranged on the case body to fasten LED capable of avoiding the dropping of the mouse due to careless operation to cause the axis of the light emitted by LED 131 to shift by the vibration and therefore induce the axis of the light emitted by LED 131 being not perpendicular to a central line of an optical system of the optical mouse, and consequently, the sensor 134 being not able to record a clear and uniform image by which the digital processor can not determines the movement and direction of the mouse accurately.

DETAILED DESCRIPTION OF THE PREFERRED EMBODIMENTS

Figure 1:
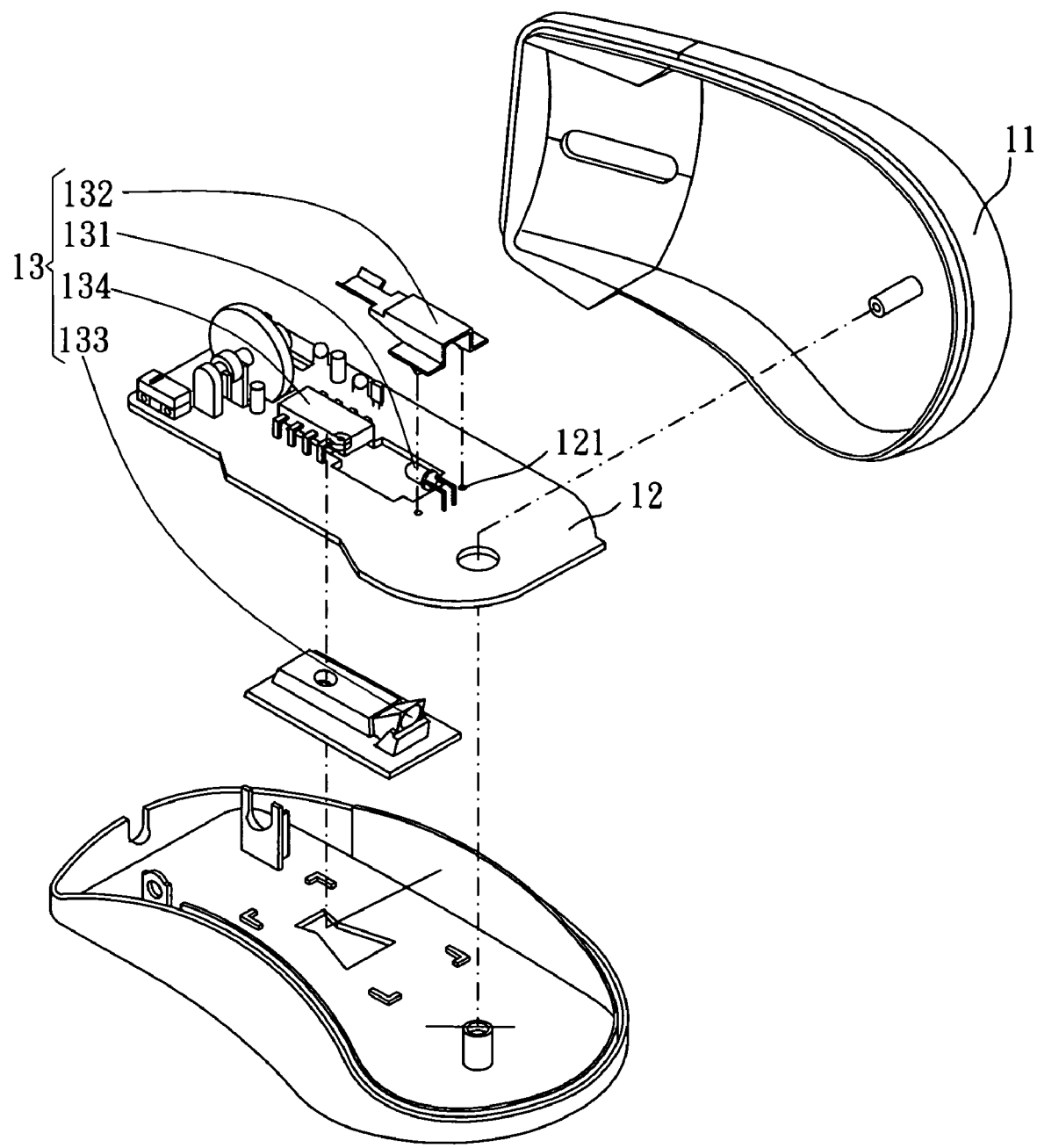
FIG. 1 is an exploded diagram of a mouse according to prior arts.
Figure 2:
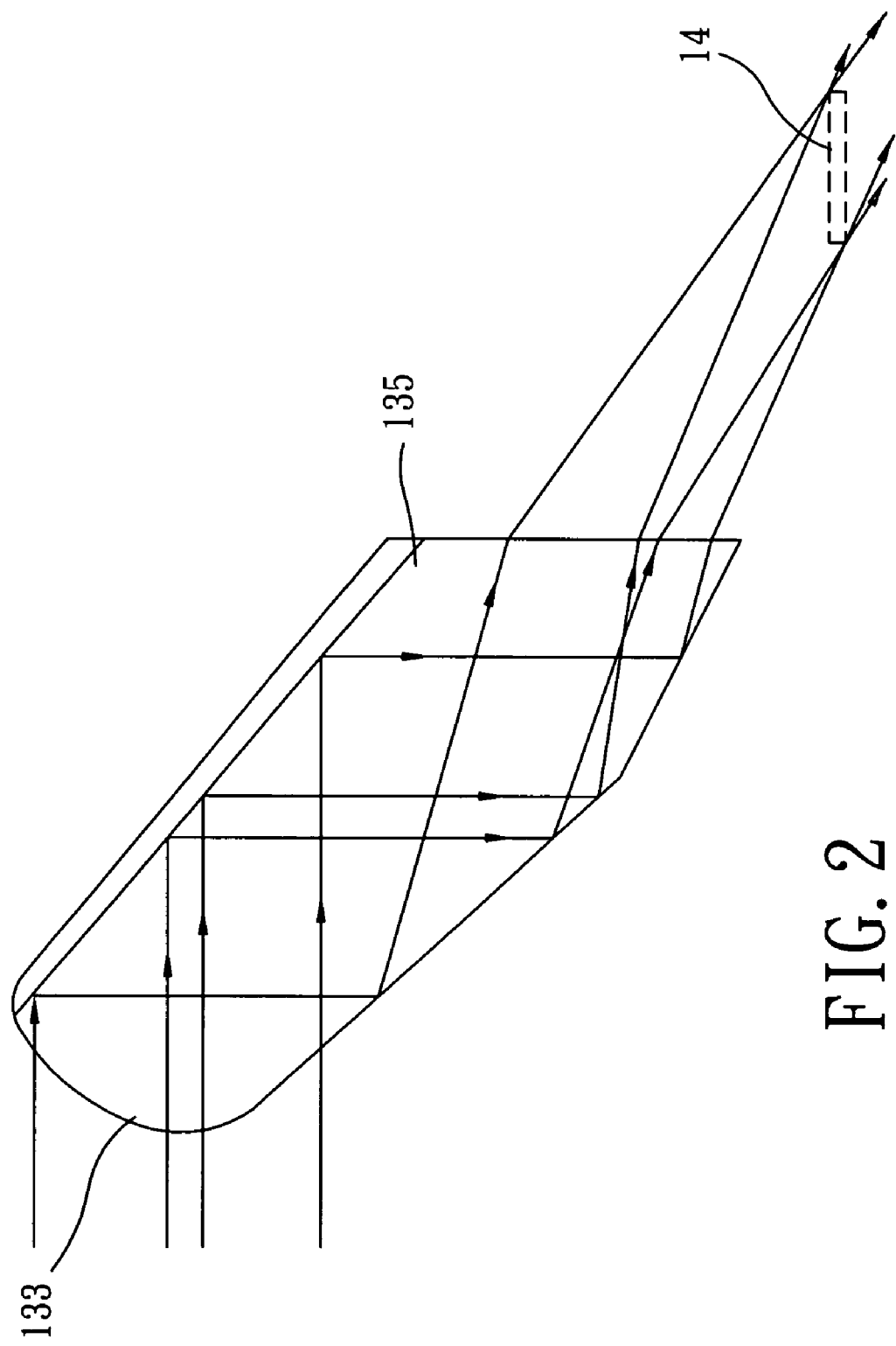
FIG. 2 is a diagram of an optical system according to U.S. Pat. No. 6,476,970.
Figures 3A, 3B:
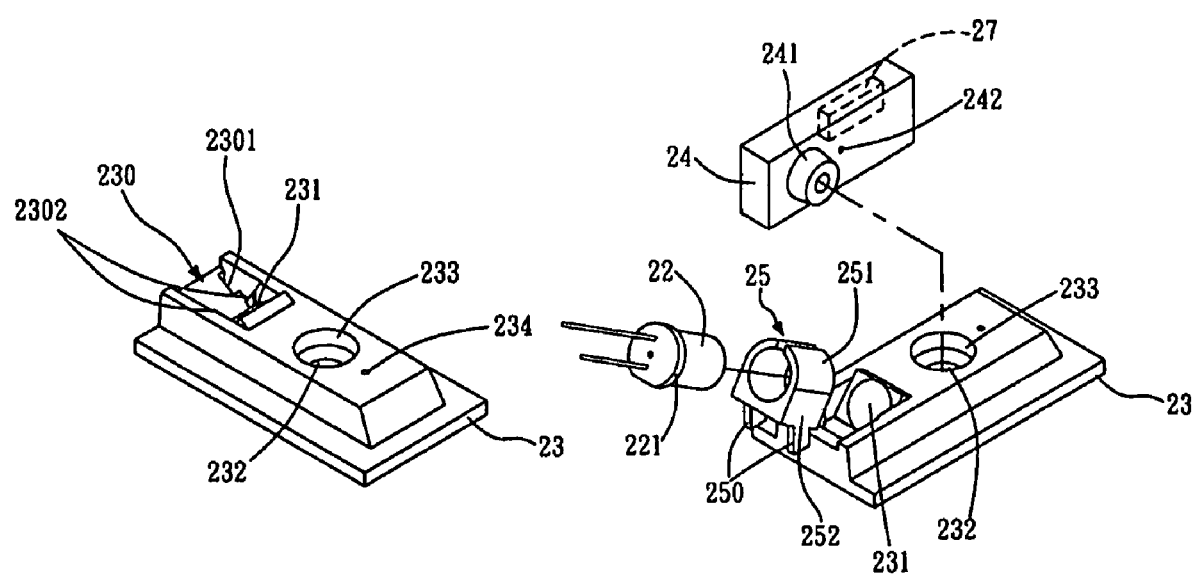
FIG. 3A is a schematic diagram showing a lens mount according to the present invention.
FIG. 3B is an exploded diagram of the present invention.
Figure 4:
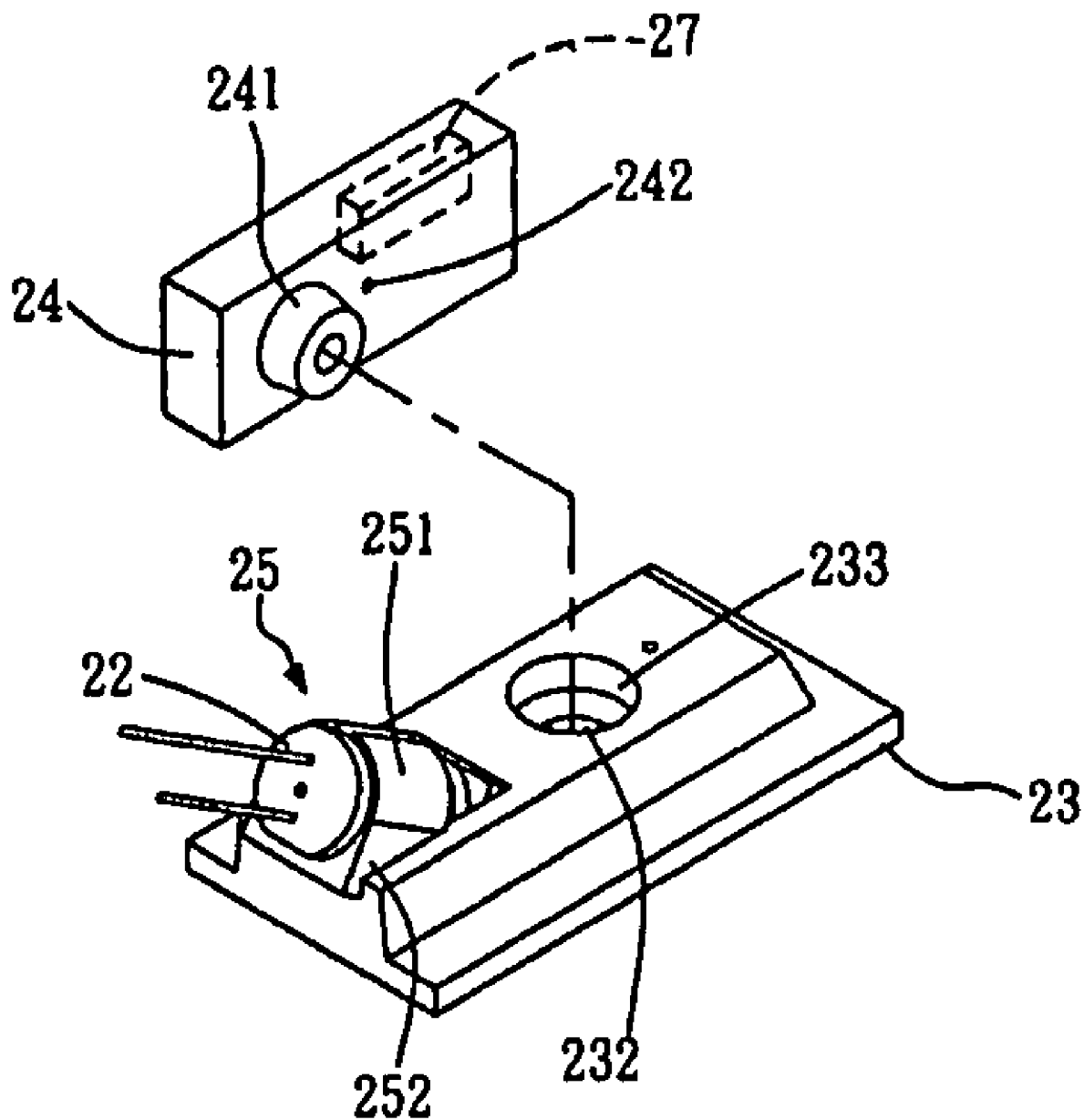
FIG. 4 is an assembly diagram of the present invention.

Please refer to FIG. 3A, FIG. 3B, FIG. 4 and FIG. 5, which are an exploded diagram of the present invention, an assembly diagram of the present invention and a cross-section view of the present invention. The present invention discloses an improved optical device for optical mouse, arranged inside a case body 21 of the optical mouse, comprising: an LED 22, a lens mount 23, a sensor 24 and a digital signal processor 27, wherein the LED 22 provides light for the optical device, and the lens mount 23 is installed on the bottom of the case body 21 of the optical mouse, and a fixing base 25 fastening the LED 22 therein is inset with the lens mount 23 so as to collimating light from the LED 22 onto a surface contacting with the bottom of the case body 21, and the sensor 24 combines with the lens mount 23 by means of a positioning structure for detecting reflected light reflected from the surface, and the digital signal processor 27 is electrically connected to the sensor 24 to receive the images from the sensor 24 for accurately determining the distance and direction of the optical mouse movement.

Figure 6:
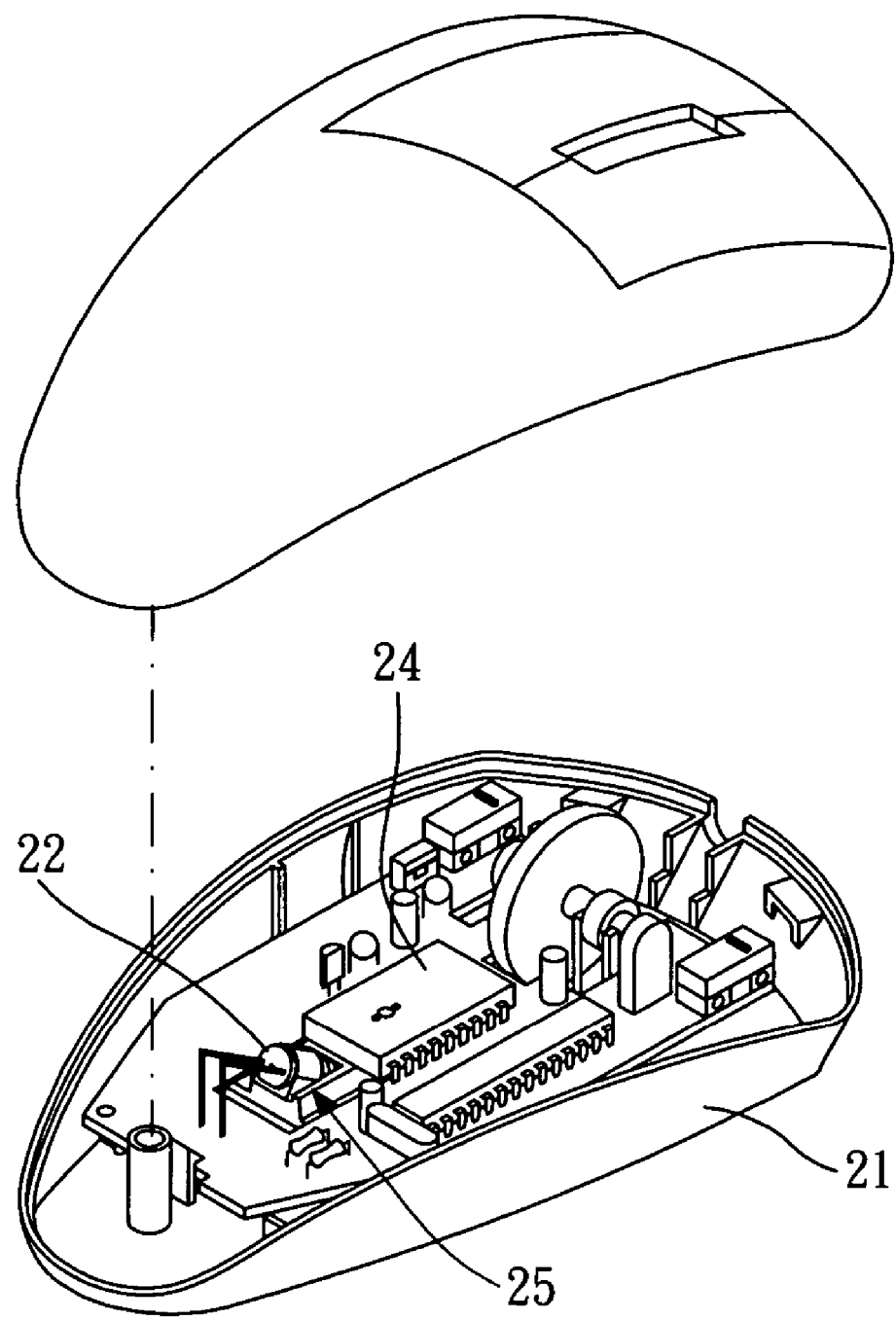
FIG. 6 is a diagram showing an embodiment of the present invention.

According to the aforesaid, instead of using the LED, the LED assembly clip, the positioning holes and the lens mount, which are separated from and independent to one another, for fixing the LED inside the optical mouse, the present invention uses a combined device featuring foolproof, and positioning-insetting-all-in-one concept can place the LED 22 precisely at the first lens 231 of the lens mount 23 and is capable of installing the LED accurately onto the lens mount and the same time rapidly and effectively adjusting and fixing the relative angle and position as seen in FIG. 6 between the lens mount and the LED. Moreover, the combined device is easy to positioned such that the forgoing shortcomings of high manufacturing cost and difficult to mass-produced are avoided.

The fixing base 25 fastening the LED 22 on the lens mount 23 includes a fixing body 251 with ring figure and a supporting pedestal 252 located on the lens mount 23, as shown in FIG. 3. A ring flange 221 is fitted around an end of the LED 22 which is used to abut against the fixing body 251 when the front of the LED 22 is inset into the fixing body 251. A first lens 231 is being disposed at a proper distance away from the fixing socket 230 of the lens mount 23, and a second lens 232 is being disposed at a position corresponding to the sensor 24. The fixing socket comprises a positioning notch 2301 and an engaging side 2302, wherein the positioning notch 2301 is designed with respect to the positioning block 250 of the fixing base 25, and the engaging side 2302 can support the fixing base 25. In this regard, the fool-proof, and positioning-insetting-all-in-one concepts can be accomplished by the cooperation of the engaging side 2302 and the fixing body 25 along with the cooperation of the positioning notch 2301 and the positioning block 250, in addition, since the distance and relative angle between the fixing socket 230 and the first lens 231 are predetermined and fixed, the LED 22 inset inside the fixing body will match with the first lens 231 appropriately while fixing the fixing body 25 onto the fixing socket 230. The combination of the fixing socket 230, the positioning notch 2301, the fixing body 25 and the positioning block 250 can achieve the object of fool-proof, and positioning-insetting-all-in-one rapidly during manufacturing the optical mouse with reference to FIG. 4. Further, the fixing base 25 provides clamping and supporting by means of the supporting pedestal 252, the fixing body 251. It is obvious that the present invention offers a better fixing and supporting effect than the prior structures of using only the LED assembly clip 132 and the positioning holes 121 for providing support. Thus, the present invention can effectively fixing and holding the LED 22 onto the fixing body 25 such that it is capable of avoiding the dropping of the mouse due to careless operation to cause the axis of the light emitted by LED 131 to shift by the vibration and therefore induce the axis 223 of the light emitted by LED 131 being not perpendicular to a central line 243 of an optical system of the optical mouse. Consequently, the present invention not only can increase accuracy, but also can enhance durability.

In addition, a sensor head 241 is disposed on a side of the sensor 24 near the lens mount 23, and an indentation portion 233 reserving the sensor head 241 is disposed on a location respective to the lens mount 23. In addition, the aforementioned positioning structure between the sensor 24 and the lens mount 23 includes at least a pair of a bulge 242 and a concave 234 respectively fitted on the sensor 24 and the lens mount 23 for preventing the axial shifting and rotating of the sensor head 241 so as to promote stability and accuracy.

Figure 5:
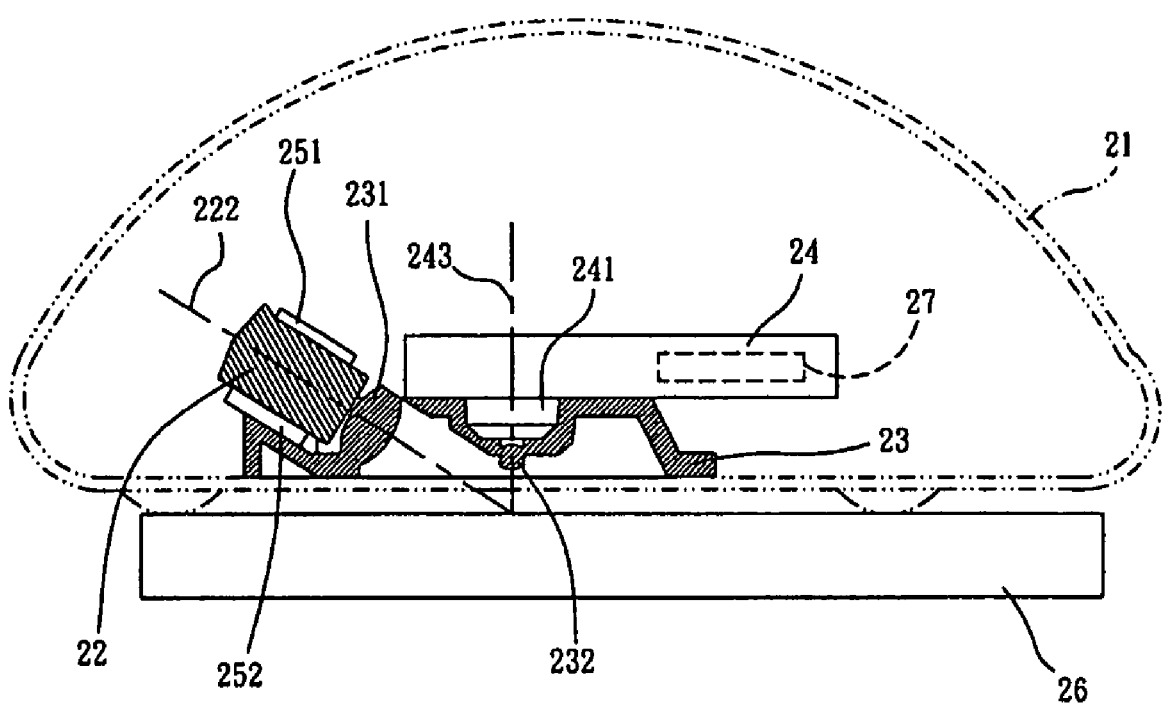
FIG. 5 is a cross-section view of the present invention.

Referring to FIG. 5, which is a cross-section view of the present invention. The fixing base 25 is able to clamp and support the LED 22 onto the lens mount 23 with an angle scope of 20° to 35° from a horizontal surface for the light being directly injected onto a working surface 26 without requiring a prism to change the optical path of the light from the LED 22 such that the cost for manufacturing the lens mount 23 can be reduced and the loss of light is also reduced.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

To sum up, the present invention is to provide an improved optical device for an optical mouse featuring a simple structure and easy maintenance. Moreover, the present invention provides an all-in-one combined device of the LED assembly clip insetting with the lens mount capable of installing the LED accurately onto the lens mount and the same time rapidly and effectively adjusting and fixing the relative angle and position between the lens mount and the LED, which can solve the forgoing shortcomings of high manufacturing cost and difficult to mass-produced. In addition, an effective positioning structure is given so as to enable the light to be collimated onto a working surface directly with no light loss, and also provide a better capability of avoiding the dropping of the mouse due to careless operation to cause the axis of the light emitted by LED 131 to shift by the vibration. While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An improved optical device for an optical mouse, being installed inside a case body of the optical mouse, comprising:
   - a LED, for providing light for the optical device;
   - a fixing base, having a plurality of positioning blocks arranged thereon;
   - a lens mount, supporting a lens, the lens mount being installed on a bottom of the case body of the optical mouse, having a fixing socket with a plurality of positioning notches and an engaging side, wherein, the LED is inset inside the fixing base and the fixing base is inset in and fixes at the fixing socket by insetting the positioning blocks into the positioning notches along with the engaging side abutting against the fixing base;
   - a sensor, supported by and combined with the lens mount by means of a positioning structure, capable of detecting and recording reflected light from a working surface; and
   - a digital signal processor, electrically connecting to the sensor to receive the image data detected by the sensor for accurately determining distances and directions of the mouse movement.

2. The improved optical device for an optical mouse according to claim 1, wherein a first lens is disposed on the lens mount at a position close to the LED, and a second lens is disposed at a position corresponding to the digital signal processor.

3. The improved optical device for an optical mouse according to claim 2, wherein a sensor head arranged on a side of the sensor near the lens mount, and an indentation portion for reserving the sensor head is being arranged on the lens mount at a position corresponding to the sensor head.

4. The improved optical device for an optical mouse according to claim 1, wherein the positioning structure comprises at least a bulge and a concave respectively fitted on a side of the sensor and a corresponding side of the lens mount.

5. The improved optical device for an optical mouse according to claim 1, wherein the fixing base further comprises: a fixing body with ring figure and a supporting pedestal.

6. The improved optical device for an optical mouse according to claim 5, wherein the fixing body is capable of accommodating the front of the LED.

7. The improved structure for an optical system of an optical mouse according to claim 5, wherein a ring flange is fitted at the end of the LED.

8. The improved optical device for an optical mouse according to claim 7, wherein the ring flange abuts against the fixing body and the supporting pedestal.

9. The improved optical device for an optical mouse according to claim 1, wherein the included angle between the LED and a horizontal surface is ranged between 20 to 35 degrees.

* * * * *